United States Patent
Peisa et al.

(10) Patent No.: US 11,224,071 B2
(45) Date of Patent: Jan. 11, 2022

(54) ON-DEMAND SYSTEM INFORMATION DELIVERY FOR EXTENDED COVERAGE

(71) Applicant: Telefonaktiebolaget LM Ericsson (publ), Stockholm (SE)

(72) Inventors: Janne Peisa, Espoo (FI); Jens Bergqvist, Linköping (SE); Riikka Susitaival, Helsinki (FI); Stefan Wager, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 213 days.

(21) Appl. No.: 15/755,171

(22) PCT Filed: Dec. 22, 2017

(86) PCT No.: PCT/SE2017/051339
§ 371 (c)(1),
(2) Date: Feb. 26, 2018

(87) PCT Pub. No.: WO2018/128575
PCT Pub. Date: Jul. 12, 2018

(65) Prior Publication Data
US 2019/0261421 A1   Aug. 22, 2019

Related U.S. Application Data

(60) Provisional application No. 62/443,395, filed on Jan. 6, 2017.

(51) Int. Cl.
*H04W 74/08* (2009.01)
*H04B 17/309* (2015.01)
*H04W 76/27* (2018.01)

(52) U.S. Cl.
CPC ...... *H04W 74/0833* (2013.01); *H04B 17/309* (2015.01); *H04W 76/27* (2018.02)

(58) Field of Classification Search
CPC . H04W 74/0833; H04W 76/27; H04B 17/309
See application file for complete search history.

(56) References Cited

U.S. PATENT DOCUMENTS 10,390,331 B2 * 8/2019 Adjakple ............. H04W 76/10
2017/0332372 A1 * 11/2017 Lee ................... H04W 72/0413
(Continued)

FOREIGN PATENT DOCUMENTS

| WO | 2016123429 A1 | 8/2016 |
| WO | 2017197063 A1 | 11/2017 |
| WO | 2018016799 A1 | 1/2018 |

OTHER PUBLICATIONS

"Consideration on coverage enhanced RACH for Rel-13 MTC UEs", 3GPP TSG RAN WG2 Meeting #89; R2-150148; Athens, Greece, Feb. 9-13, 2015, pp. 1-4.
(Continued)

*Primary Examiner* — Hassan Kizou
*Assistant Examiner* — Abdullahi Ahmed
(74) *Attorney, Agent, or Firm* — Murphy, Bilak & Homiller, PLLC

(57) ABSTRACT

Systems and methods for delivery of on-demand system information in a cellular communications network are disclosed. In some embodiments, a method of operation of a network node comprises transmitting, to a User Equipment (UE), minimum system information including a set of signal quality indication levels and corresponding random access parameter(s) and detecting a random access request from the UE that uses the random access parameter(s) configured for the signal quality indication level that corresponds to a signal quality level measured at the UE. The method further comprises deciding whether to deliver on-demand system information to the UE via a broadcast or dedicated signaling based on the signal quality level measured at the UE, broadcasting on-demand system information upon deciding (Continued)

High-level concept of on-demand SI provisioning to deliver on-demand system information via a broadcast, and delivering on-demand system information to the UE via dedicated signaling upon deciding to deliver on-demand system information via dedicated signaling.

23 Claims, 8 Drawing Sheets

(56) References Cited

U.S. PATENT DOCUMENTS

| | | | |
|---|---|---|---|
| 2018/0035456 A1* | 2/2018 | Jeong | H04W 74/0866 |
| 2018/0084578 A1* | 3/2018 | Kato | H04W 74/006 |
| 2019/0037479 A1* | 1/2019 | Suzuki | H04W 72/0446 |
| 2019/0253956 A1* | 8/2019 | Fujishiro | H04W 48/14 |
| 2019/0268831 A1* | 8/2019 | Lee | H04W 48/14 |
| 2019/0312711 A1* | 10/2019 | Stern-Berkowitz | H04L 5/0053 |

OTHER PUBLICATIONS

"Initial access procedure to support multiple numerologies in NR", 3GPP TSG-RAN WG2 Meeting #96; R2-168087; Reno, USA, Nov. 14-18, 2016, pp. 1-5.

"Preliminary view on Initial Access in 5G", 3GPP TSG-RAN WG2 Meeting #93bis; R2-162300; Dubrovnik, Croatia, Apr. 15-11, 2016, pp. 1-3.

"3rd Generation Partnership Project; Technical Specification Group Radio Access Network; Study on New Radio Access Technology; Radio Interface Protocol Aspects (Release 14)", 3GPP TR 38.804 V0.4.0, Nov. 2016, pp. 1-30.

"3GPP TSG-RAN WG2 Meeting #96", R2-167400; Reno, USA, Nov. 14-18, 2016, pp. 1-18.

"System information for low complexity and extended coverage", 3GPP TSG-RAN WG2 #96; Tdoc R2-168288; Reno, Nevada, Nov. 14-18, 2016, pp. 1-4.

* cited by examiner

High-level concept of on-demand SI provisioning

ON-DEMAND SYSTEM INFORMATION DELIVERY FOR EXTENDED COVERAGE

RELATED APPLICATIONS

This application claims the benefit of provisional patent application Ser. No. 62/443,395, filed Jan. 6, 2017, the disclosure of which is hereby incorporated herein by reference in its entirety.

TECHNICAL FIELD

Fifth Generation (5G), New Radio (NR), massive Machine Type Communication (mMTC), extended coverage

BACKGROUND

One of the design goals of the New Radio (NR) for Fifth Generation (5G) is to provide support for extended coverage operation. This is especially relevant for the design of the system information mechanisms for NR, as system information and initial access are not as easy to modify or enhance in later releases as features requiring primarily dedicated signaling.

One aspect which has had a major impact on the system information design for enhanced Machine Type Communication (eMTC) and Narrowband Internet of Things (NB-IoT) systems is the support required for extended coverage operation.

It has been decided that part of the system information may be provided on-demand to the User Equipment devices (UEs). The on-demand mechanism is described in Technical Report (TR) 38.804 V0.4.0 as below:

System information is divided into minimum SI and other SI. Minimum SI is periodically broadcast. The minimum SI comprises basic information required for initial access to a cell and information for acquiring any other SI broadcast periodically or provisioned via on-demand basis. The other SI encompasses everything not broadcast in the minimum SI. The other SI may either be broadcast, or provisioned in a dedicated manner, either triggered by the network or upon request from the UE as illustrated in FIG. 5.5.3.1.2-1. For the other SI required by the UE, before the UE sends the other SI request the UE needs to know whether it is available in the cell and whether it is broadcast or not (e.g. by checking the minimum SI). The UE in RRC_IDLE or RRC_INACTIVE should be able to request the other SI without requiring a state transition. The other SI may be broadcast at configurable periodicity and for certain duration. PWS information can be classified into the other SI.

Editor's note: Additional stage-2 level agreements are to be captured here.

FIG. 1 corresponds to FIG. 5.5.3.1.2-1 of Third Generation Partnership Project (3GPP) TR 38.804 V0.4.0 and illustrates the high level concept of on-demand system information provisioning.

In Long Term Evolution (LTE), a UE may be in extended coverage, i.e. the UE may require the use of enhanced coverage functionality to access the cell. There are two enhanced coverage modes (mode A, mode B). The enhanced coverage functionality is indicated in the Master Information Block (MIB) of the cell. A UE capable of enhanced coverage acquires either system information for normal coverage or system information specific for UEs in enhanced coverage.

A set of Physical Random Access Channel (PRACH) resources (e.g., time, frequency, preamble), each associated with a coverage enhancement level, is provided in a System Information Block (SIB). The number of PRACH repetitions and the number of maximum preamble transmission attempts per coverage enhancement level are provided in the SIB. UEs in the same enhanced coverage level use random access resources associated with the same enhanced coverage level. Time/frequency resources and repetition factor for Random Access Response (RAR) messages for UEs in enhanced coverage are derived from the used PRACH resources.

In practice, this means that, in LTE, random access information is provided at each coverage level. The UE will perform random access starting from the first (best) coverage, and move to the next levels (worse coverage) if it does not receive a RAR from the network even after ramping up the power.

In NR, for extended coverage users, on-demand system information could be delivered using the on-demand mechanism, as proposed in Ericsson, "R2-168288: System information for low complexity and extended coverage," 3GPP TSG-RAN WG2 #96, Nov. 14-18, 2016.

SUMMARY

Systems and methods are disclosed herein that relate to delivery of on-demand system information in a cellular communications network. In some embodiments, a method of operation of a network node in a cellular communications network comprises transmitting, to a User Equipment (UE), minimum system information including a set of signal quality indication levels and corresponding one or more random access parameters configured for each signal quality indication level in the set of signal quality indication levels and detecting a random access request from the UE, where the random access request uses the one or more random access parameters configured for one of the set of signal quality indication levels that corresponds to a signal quality level measured at the UE. The method further comprises deciding whether to deliver on-demand system information to the UE via a broadcast or dedicated signaling based on the signal quality level measured at the UE as indicated by the one or more random access parameters used for the random access request. The method further comprises, upon deciding to deliver on-demand system information to the UE via a broadcast, broadcasting on-demand system information. The method further comprises, upon deciding to deliver on-demand system information to the UE via dedicated signaling, delivering on-demand system information to the UE via dedicated signaling. In this manner, on-demand system information can be delivered to a UE in poor coverage as indicated by the random access parameters used by the UE.

In some embodiments, the one or more random access parameters comprise a preamble and/or a timing and/or a transmission resource. In some embodiments, the signal quality is Reference Signal Received Power (RSRP) or Reference Signal Received Quality (RSRQ).

In some embodiments, delivering on-demand system information to the UE via dedicated signaling comprises sending a Random Access Response (RAR) to the UE, receiving from the UE a connection request within an on-demand system information request, and sending on-demand system information to the UE via dedicated signaling upon receiving the connection request with the on-demand system information request. Further, in some embodiments, sending on-demand system information to the UE via dedicated signaling comprises sending on-demand system information to the UE in a Radio Resource Control (RRC) Connection Setup message or an RRC Connection Reconfiguration message. In some other embodiments, sending on-demand system information to the UE via dedicated signaling comprises sending on-demand system information to the UE in an RRC Connection Release message. In some embodiments, the connection request is an RRC connection request.

In some embodiments, delivering on-demand system information to the UE via dedicated signaling comprises sending a RAR to the UE, receiving from the UE an RRC message within an on-demand system information request, and sending on-demand system information to the UE via dedicated signaling upon receiving the RRC message with the on-demand system information request.

In some embodiments, delivering on-demand system information to the UE via dedicated signaling comprises sending a RAR to the UE, receiving from the UE an RRC resume request within an on-demand system information request, and sending on-demand system information to the UE via dedicated signaling upon receiving the RRC resume request with the on-demand system information request.

Embodiments of a network node for a cellular communications network are also disclosed. In some embodiments, a network node for a cellular communications network is adapted to transmit, to a UE, minimum system information including a set of signal quality indication levels and corresponding one or more random access parameters configured for each signal quality indication level in the set of signal quality indication levels and detect a random access request from the UE, where the random access request uses the one or more random access parameters configured for one of the set of signal quality indication levels that corresponds to a signal quality level measured at the UE. The network node is further adapted to decide whether to deliver on-demand system information to the UE via a broadcast or dedicated signaling based on the signal quality level measured at the UE as indicated by the one or more random access parameters used for the random access request. The network node is further adapted to broadcast on-demand system information upon deciding to deliver on-demand system information to the UE via a broadcast and deliver on-demand system information to the UE via dedicated signaling upon deciding to deliver on-demand system information to the UE via dedicated signaling.

In some embodiments, a network node for a cellular communications network comprises at least one processor and memory comprising instructions executable by the at least one processor whereby the network node is operable to transmit, to a UE, minimum system information including a set of signal quality indication levels and corresponding one or more random access parameters configured for each signal quality indication level in the set of signal quality indication levels and detect a random access request from the UE, where the random access request uses the one or more random access parameters configured for one of the set of signal quality indication levels that corresponds to a signal quality level measured at the UE. By execution of the instructions by the at least one processor, the network node is further operable to decide whether to deliver on-demand system information to the UE via a broadcast or dedicated signaling based on the signal quality level measured at the UE as indicated by the one or more random access parameters used for the random access request, broadcast on-demand system information upon deciding to deliver on-demand system information to the UE via a broadcast, and deliver on-demand system information to the UE via dedicated signaling upon deciding to deliver on-demand system information to the UE via dedicated signaling.

In some embodiments, a network node for a cellular communications network comprises a transmitting module, a detecting module, a deciding module, a broadcasting module, and a dedicated signaling module. The transmitting module is operable to transmit, to a UE, minimum system information including a set of signal quality indication levels and corresponding one or more random access parameters configured for each signal quality indication level in the set of signal quality indication levels. The detecting module is operable to detect a random access request from the UE where the random access request uses the one or more random access parameters configured for one of the set of signal quality indication levels that corresponds to a signal quality level measured at the UE. The deciding module is operable to decide whether to deliver on-demand system information to the UE via a broadcast or dedicated signaling based on the signal quality level measured at the UE as indicated by the one or more random access parameters used for the random access request. The broadcasting module is operable to broadcast on-demand system information upon the deciding module deciding to deliver on-demand system information to the UE via a broadcast. The dedicated signaling module is operable to deliver on-demand system information to the UE via dedicated signaling upon the deciding module deciding to deliver on-demand system information to the UE via dedicated signaling.

Embodiments of a method of operation of a UE are also disclosed. In some embodiments, a method for a UE in a cellular communications network comprises receiving, from the cellular communications network, minimum system information including a set of signal quality indication levels and corresponding one or more random access parameters configured for each signal quality indication level in the set of signal quality indication levels, measuring a signal quality level at the UE, and transmitting a random access request using the one or more random access parameters configured for the one of the set of signal quality indication levels that corresponds to the measured signal quality level at the UE. The method further comprises receiving, from the cellular communications network, on-demand system information via broadcast or dedicated signaling depending on the measured signal quality level at the UE as indicated to the cellular communications network by the use of the one or more random access parameters.

In some embodiments, the one or more random access parameters comprise a preamble and/or a timing and/or a transmission resource.

In some embodiments, the signal quality is Reference Signal Received Power (RSRP) or Reference Signal Received Quality (RSRQ).

In some embodiments, receiving on-demand system information via broadcast or dedicated signaling comprises receiving, from the cellular communications network, an RAR comprising an indication to establish a connection for on-demand system information, sending a connection request to the cellular communications network where the connection request comprises a request for on-demand system information, and receiving from the cellular communications network, the on-demand system information using dedicated signaling. In some embodiments, receiving the on-demand system information via dedicated signaling comprises receiving the on-demand system information in an RRC Connection Setup message or an RRC Connection Reconfiguration message. In some embodiments, receiving the on-demand system information via dedicated signaling comprises receiving the on-demand system information in an RRC Connection Release message. In some embodiments, the connection request is an RRC connection request.

In some embodiments, receiving on-demand system information via broadcast or dedicated signaling comprises receiving, from the cellular communications network, an RAR comprising an indication to establish a connection for on-demand system information; sending an RRC message to the cellular communications network where the RRC message comprises a request for on-demand system information; and receiving, from the cellular communications network, the on-demand system information using dedicated signaling.

In some embodiments, receiving on-demand system information via broadcast or dedicated signaling comprises receiving, from the cellular communications network, an RAR comprising an indication to establish a connection for on-demand system information; sending an RRC resume request to the cellular communications network where the RRC resume request comprises a request for on-demand system information; and receiving, from the cellular communications network, the on-demand system information using dedicated signaling.

Embodiments of a UE are also disclosed. In some embodiments, a UE for a cellular communications network is adapted to receive, from the cellular communications network, minimum system information including a set of signal quality indication levels and corresponding one or more random access parameters configured for each signal quality indication level in the set of signal quality indication levels, measure a signal quality level at the UE, and transmit a random access request using the one or more random access parameters configured for the one of the set of signal quality indication levels that corresponds to the measured signal quality level at the UE. The UE is further adapted to receive, from the cellular communications network, on-demand system information via broadcast or dedicated signaling depending on the measured signal quality level at the UE as indicated to the cellular communications network by the use of the one or more random access parameters.

In some embodiments, a UE for a cellular communications network comprises at least one transceiver, at least one processor, and memory comprising instructions executable by the at least one processor whereby the UE is operable to receive, from the cellular communications network, minimum system information including a set of signal quality indication levels and corresponding one or more random access parameters configured for each signal quality indication level in the set of signal quality indication levels, measure a signal quality level at the UE, and transmit a random access request using the one or more random access parameters configured for the one of the set of signal quality indication levels that corresponds to the measured signal quality level at the UE. By execution of the instructions by the at least one processor, the UE is further operable to receive, from the cellular communications network, on-demand system information via broadcast or dedicated signaling depending on the measured signal quality level at the UE as indicated to the cellular communications network by the use of the one or more random access parameters.

In some embodiments, a UE for a cellular communications network comprises a first receiving module, a measuring module, a transmitting module, and a second receiving module. The first receiving module is operable to receive, from the cellular communications network, minimum system information including a set of signal quality indication levels and corresponding one or more random access parameters configured for each signal quality indication level in the set of signal quality indication levels. The measuring module is operable to measure a signal quality level at the UE. The transmitting module is operable to transmit a random access request using the one or more random access parameters configured for the one of the set of signal quality indication levels that corresponds to the measured signal quality level at the UE. The second receiving module is operable to receive, from the cellular communications network, on-demand system information via broadcast or dedicated signaling depending on the measured signal quality level at the UE as indicated to the cellular communications network by the use of the one or more random access parameters.

In some other embodiments, a method for a UE in a cellular communications network comprises measuring a signal quality level at the UE to thereby obtain a signal quality level measurement and, upon determining that the signal quality level measurement is less than a threshold that is indicative of the UE being in a bad coverage scenario, sending a message to the cellular communications network where the message comprises a request for on-demand system information and receiving on-demand system information from the cellular communications network via dedicated signaling in response to the request for on-demand system information.

In some embodiments, the message is a connection request. In some embodiments, the message is an RRC message.

In some embodiments, the method further comprises, upon determining that the signal quality level measurement is greater than a threshold that is indicative of the UE being in a good coverage scenario, sending, to the cellular communications network, a random access preamble that will lead to broadcast of the on-demand system information and receiving, from the cellular communications network, a broadcast of the on-demand system information.

In some embodiments, receiving the on-demand system information from the cellular communications network via dedicated signaling comprises receiving the on-demand system information from the cellular communications network in an RRC Connection Setup message or an RRC Connection Reconfiguration message.

In some embodiments, receiving the on-demand system information from the cellular communications network via dedicated signaling comprises receiving the on-demand system information from the cellular communications network in an RRC Connection Release message.

In some embodiments, the message is an RRC connection request.

In some other embodiments, a UE for a cellular communications network is adapted to measure a signal quality level at the UE to thereby obtain a signal quality level measurement and, upon determining that the signal quality level measurement is less than a threshold that is indicative of the UE being in a bad coverage scenario, send a message to the cellular communications network where the message comprises a request for on-demand system information and receive on-demand system information from the cellular communications network via dedicated signaling in response to the request for on-demand system information.

In some embodiments, a UE for a cellular communications network comprises at least one transceiver, at least one processor, and memory comprising instructions executable by the at least one processor whereby the UE is operable to measure a signal quality level at the UE to thereby obtain a signal quality level measurement and, upon determining that the signal quality level measurement is less than a threshold that is indicative of the UE being in a bad coverage scenario, send a message to the cellular communications network where the message comprises a request for on-demand system information and receive on-demand system information from the cellular communications network via dedicated signaling in response to the request for on-demand system information.

In some other embodiments, a UE for a cellular communications network comprises a measuring module and a receiving module. The measuring module is operable to measure a signal quality level at the UE to thereby obtain a signal quality level measurement. The receiving module is operable to, upon determining that the signal quality level measurement is less than a threshold that is indicative of the UE being in a bad coverage scenario, send a message to the cellular communications network where the message comprising a request for on-demand system information and receive on-demand system information from the cellular communications network via dedicated signaling in response to the request for on-demand system information.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
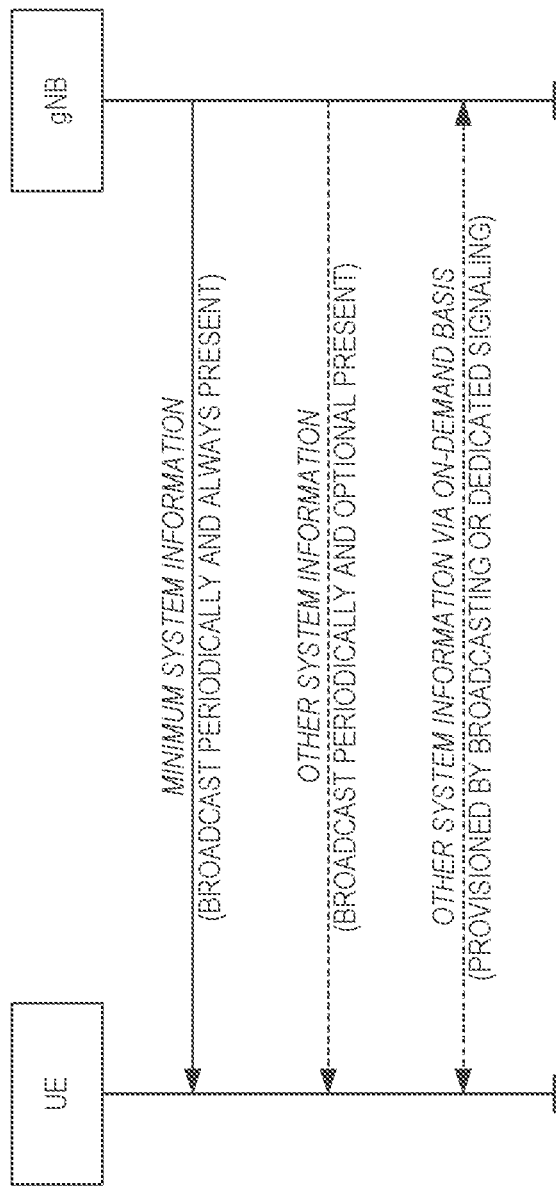
FIG. 1 illustrates the high-level concept of on-demand system information provisioning.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" is any node in a radio access network of a cellular communications network that operates to wirelessly transmit and/or receive signals. Some examples of a radio access node include, but are not limited to, a base station (e.g., an enhanced or evolved Node B (eNB) in a Third Generation Partnership Project (3GPP) Long Term Evolution (LTE) network or a New Radio (NR) base station (gNB) in a 3GPP NR network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network (PDN) Gateway (P-GW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the radio access network or the core network of a cellular communications network/system.

Note that the description given herein focuses on a 3GPP cellular communications system and, as such, 3GPP LTE terminology or terminology similar to 3GPP LTE terminology is oftentimes used. However, the concepts disclosed herein are not limited to LTE or a 3GPP system.

Note that, in the description herein, reference may be made to the term "cell;" however, particularly with respect to Fifth Generation (5G), or NR, concepts, beams may be used instead of cells and, as such, it is important to note that the concepts described herein are equally applicable to both cells and beams.

A current 3GPP agreement for NR is based on on-demand system information being broadcasted after receiving a request from the UE and, due to a potentially large number of users in a cell using coverage extension, broadcasting is the preferred mechanism for delivering system information. However, dimensioning the broadcast coverage to always reach users in the worst radio conditions in an extended coverage region might be prohibitively expensive. For those users it would be beneficial to deliver the system information using dedicated signaling to benefit from techniques like beamforming and Hybrid Automatic Repeat Request (HARQ).

It has already been agreed that dedicated Radio Resource Control (RRC) signaling can be used for the request and delivery of other system information for UEs in connected mode, but not yet for users in the idle mode.

According to embodiments of the present disclosure, a mechanism is introduced to allow UEs in poor coverage to receive system information provided using an on-demand mechanism. The mechanism consists of determining in the UE that it is in poor coverage and requires on-demand system information and indicating this to the network using special signaling.

The proposed solution allows UEs in an extended coverage mode to obtain on-demand system information in a NR system, allowing the system to save a significant amount of system resources needed for broadcast transmission of all information.

Figure 2:
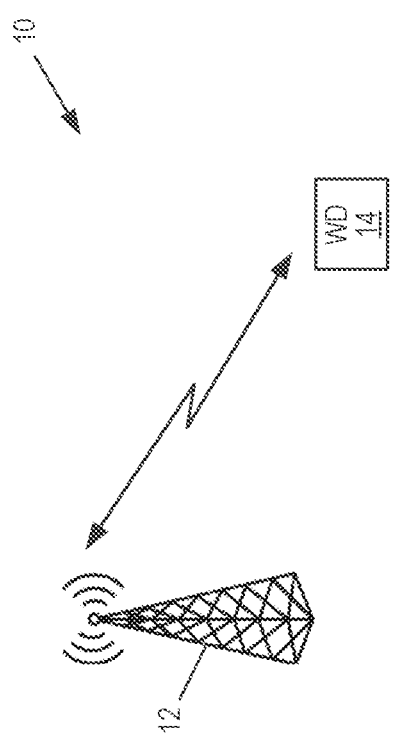
FIG. 2 illustrates one example of a wireless communication system in which embodiments of the present disclosure may be implemented.

FIG. 2 illustrates one example of a wireless communications system 10 (e.g., a cellular network) in which embodiments of the present disclosure may be implemented. As illustrated, the wireless communications system 10 includes a radio access node 12 that provides wireless, or radio, access to a wireless device 14. In some embodiments, the wireless communications system 10 is a 3GPP NR or 5G network in which case the radio access node 12 is a gNB (and thus referred to herein as a gNB 12). Notably, for the following description, the radio access node 12 is a gNB and therefore is referred to as a gNB 12 and the wireless device 14 is a UE and therefore is referred to as a UE 14; however, the present disclosure is not limited thereto. The embodiments described herein are equally applicable to other types of wireless devices and radio access nodes in other types of wireless communications systems.

Figure 3:
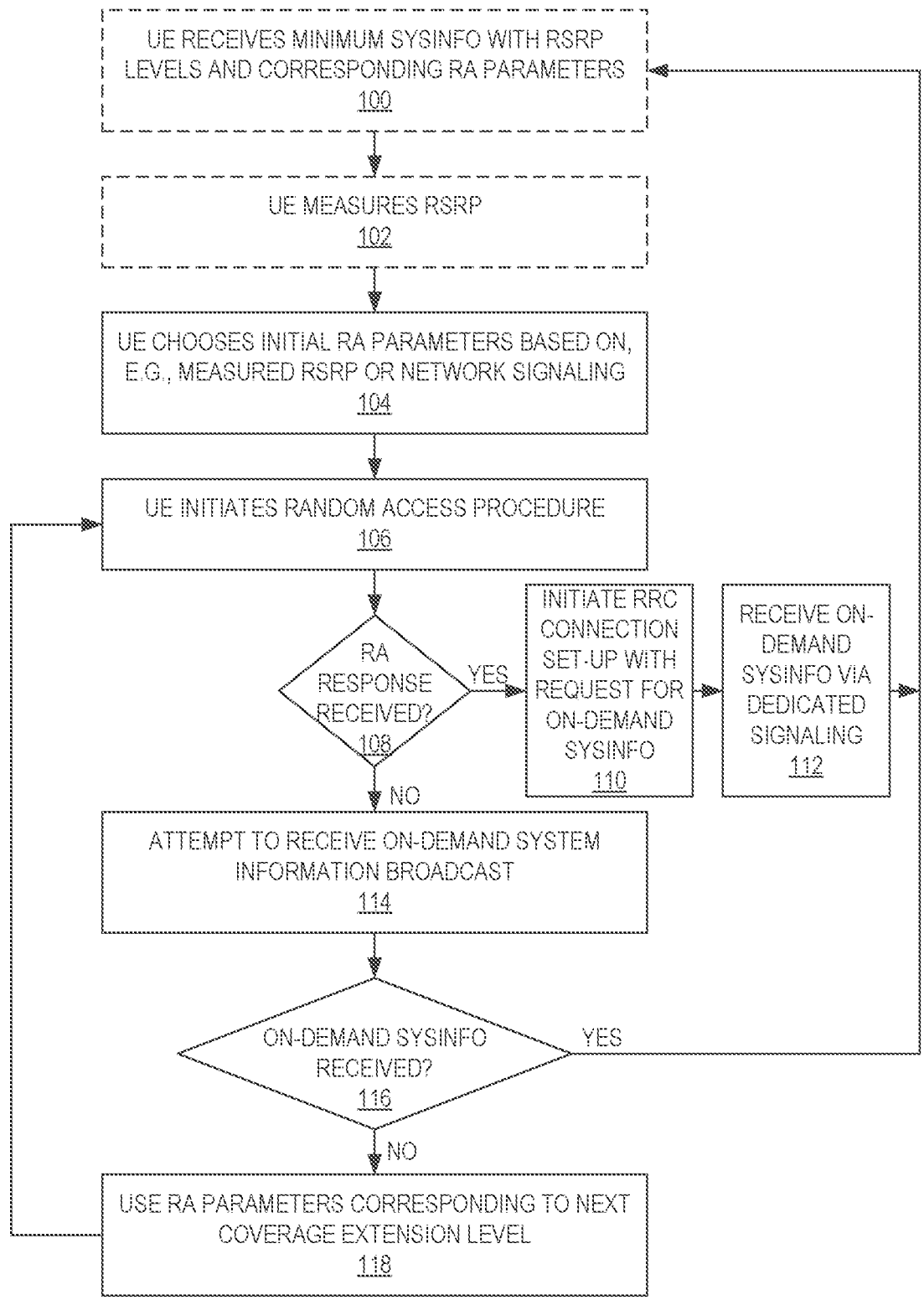
FIG. 3 is a flow chart that illustrates the operation of a wireless device (e.g., a User Equipment device (UE)) according to some embodiments of the present disclosure.

FIG. 3 illustrates the operation of the UE 14 according to some embodiments of the present disclosure. The network (e.g., the gNB 12) broadcasts and the UE 14 receives minimum system information (sysinfo) including a set of signal quality (e.g., Reference Signal Received Power (RSRP), Reference Signal Received Quality (RSRQ), or other quality indication) levels for coverage extension and corresponding Random Access (RA) information (e.g., preamble, timing, resources, etc.), step 100. The UE 14 measures the quality (e.g., RSRP, RSRQ, or other quality indication) level, step 102.

Based on the measured quality level or network signaling, the UE 14 determines random access parameters based on, e.g., an initial estimate of the link quality or a fixed rule in the specification (similar to a LTE mechanism) or some other mechanism, step 104. For example, based on the measured quality level, the UE 14 selects random access parameters that correspond to its estimated coverage extension level. Specifically, in some embodiments, the UE 14 selects the random access parameters (e.g., preamble, timing, resources, etc.) defined for the estimated quality level in the received minimum system information.

The UE 14 initiates a random access procedure using the selected random access parameters, step 106. During the random access procedure, the UE 14 transmits a random access preamble that operates as a request for on-demand system information. If the gNB 12 detects the random access preamble transmitted by the UE 14, the gNB 12 can, depending on, e.g., the amount of coverage extension needed, current system load, etc., either:
  a. turn on the broadcast of the on-demand System Information Blocks (SIBs); or
  b. send a random access response indicating to the UE 14 that the UE 14 should make a RRC connection request for dedicated signaling.

After transmitting the random access preamble, the UE 14 monitors the downlink for a possible response to the transmitted random access preamble requesting on-demand system information from the network, e.g., from the gNB 12, step 108. If the UE 14 has received a Random Access Response (RAR), step 108; YES, the UE 14 initiates an RRC connection request with a request for on-demand system information, step 110. The gNB 12 then provides the on-demand system information to the UE 14 using dedicated signaling. The UE 14 receives the on-demand system information via the dedicated signaling, step 112. The on-demand system information can be provided to the UE 14 in an RRCConnectionSetup message or later on in an RRCConnectionReconfiguration message.

Returning to step 108, if the UE 14 does not receive a RAR, step 108; NO, the UE 14 will attempt to receive on-demand system information according to an alternative where the gNB 12 has started the transmission of the on-demand SIB based on received request, (step 114. In some embodiments, the UE 14 attempts to read the on-demand system information directly upon determining that it has not received a RAR. In some other embodiments, the UE 14 attempts to read the on-demand system information if there in an indication of the presence of broadcast of on-demand system information in minimum system information (e.g., either in the Master Information Block (MIB), SIB1, or SIB2) received by the UE 14, thereby optimizing network/system capacity. If the UE 14 has not received a RAR and cannot detect the on-demand system information (determined by, e.g., a timer or a window), step 116, NO, the UE 14 will update the random access parameters to match the next (worst) coverage extension level, step 118, and retry the process from step 106. Conversely, if the UE 14 has not received a RAR but does detect the on-demand system information, step 116, YES, the process may start over at step 100. For example, if the network does not receive the random access request from the UE 14, the UE 14 will not receive a RAR and may not then detect on-demand system information. In this case, the UE 14 may re-start the process by returning to step 100.

Figure 4:
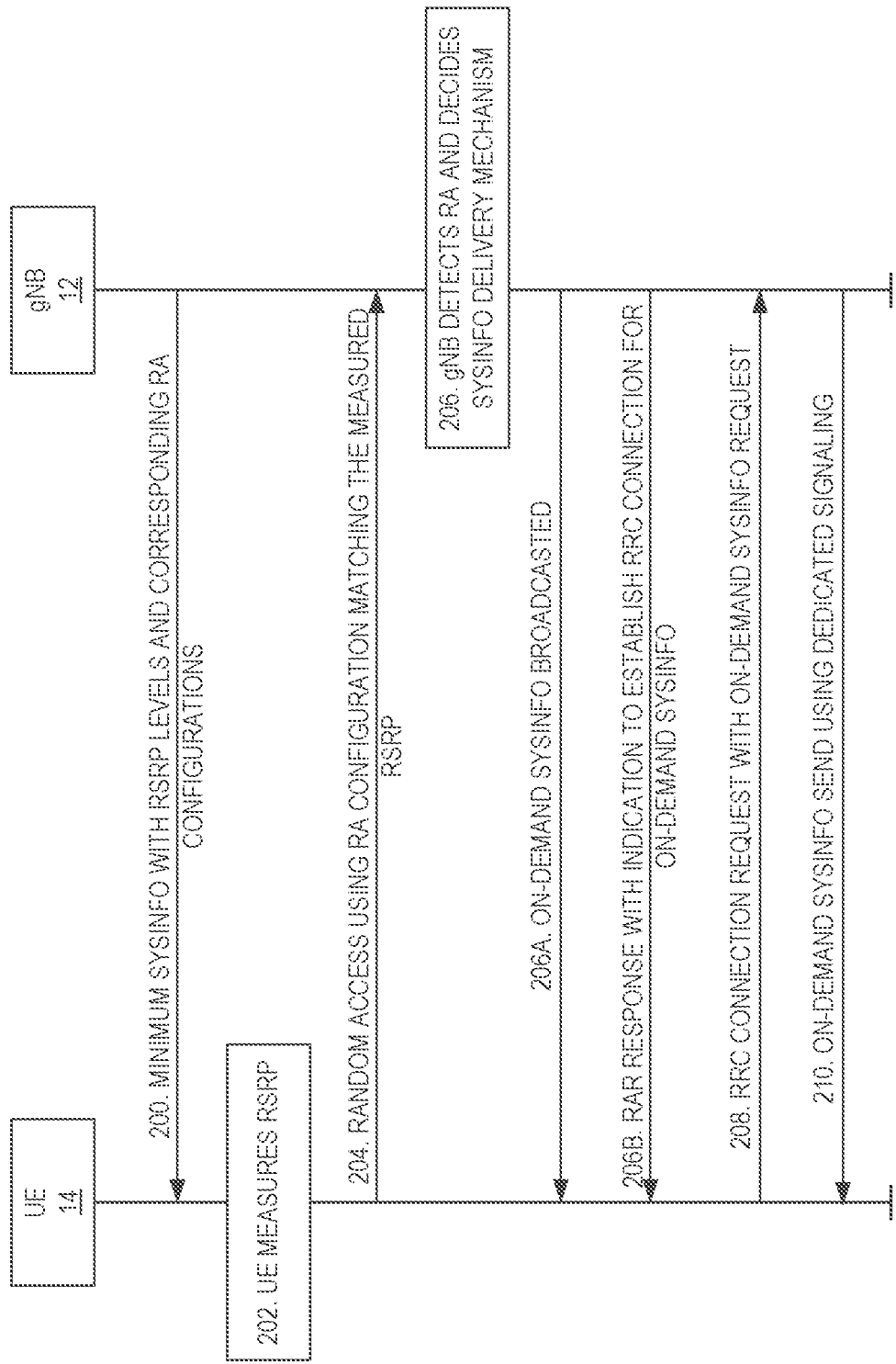
FIG. 4 illustrates the operation of a wireless device (e.g., a UE) and a radio access node (e.g., a New Radio (NR) base station (gNB)) according to some embodiments of the present disclosure.

FIG. 4 illustrates the operation of the gNB 12 and the UE 14 according to some embodiments of the present disclosure. As illustrated, the network (e.g., the gNB 12) broadcasts and the UE 14 receives minimum system information including a set of signal quality levels (which in this example are RSRP levels) for coverage extension and corresponding random access configurations, step 200. As used herein, each random access configuration includes one or more random access parameters (e.g., preamble, timing, resources, etc.). The UE 14 measures RSRP, step 202.

Based on the measured RSRP, the UE 14 determines random access parameters as discussed above. For example, in some embodiments, the UE 14 selects the random access configuration provided in the minimum system information for the measured RSRP. The UE 14 initiates a random access procedure using the selected random access parameters. During the random access procedure, the UE 14 transmits a random access preamble that operates as a request for on-demand system information, step 204. In this example, the gNB 12 detects the random access preamble transmitted by the UE 14 and decides a delivery mechanism, i.e., broadcast or dedicated signaling for the on-demand system information, step 206. As discussed above, the gNB 12 may decide the delivery mechanism based on amount of coverage extension needed for the UE 14, system load, etc. In some embodiments, the gNB 12 detects which random access configuration, i.e., which random access parameters, such as random access preamble or random access occasion were used by the UE 14 for transmission of the random access preamble and uses this information to determine the amount of coverage extension needed for the UE 14, e.g., the coverage level of the UE 14. Thus, if the UE 14 is in poor coverage, the UE 14 selects a corresponding random access configuration based on its measured RSRP and transmits the random access preamble using the selected random access configuration, thereby indicating that the UE 14 is in poor coverage, i.e., that a large amount of coverage extension is needed, which can be interpreted by the gNB 12 as a request for delivery of the on-demand system information via dedicated signaling.

If the gNB 12 decides to broadcast the on-demand system information, the gNB 12 broadcasts the on-demand system information, step 206A.

Alternatively, if the gNB 12 decides to deliver the on-demand system information to the UE 14 using dedicated signaling, the gNB 12 sends a RAR to the UE 14, where the RAR indicates that the UE 14 is to establish an RRC connection for on-demand system information, step 206B.

Upon receiving the RAR, the UE 14 sends an RRC connection request to the gNB 12, where the RRC connection request includes a request for on-demand system information, step 208. Upon receiving the RRC connection request, the gNB 12 transmits the on-demand system information to the UE 14 using dedicated signaling, as described above, step 210.

The processes of FIGS. 3 and 4 may vary. Some example variations are described below. In one variation, the RRC connection request in step 110 of FIG. 3 or step 208 of FIG. 4 may include a special field indicating that the UE 14 is requesting on-demand system information.

Figure 5:
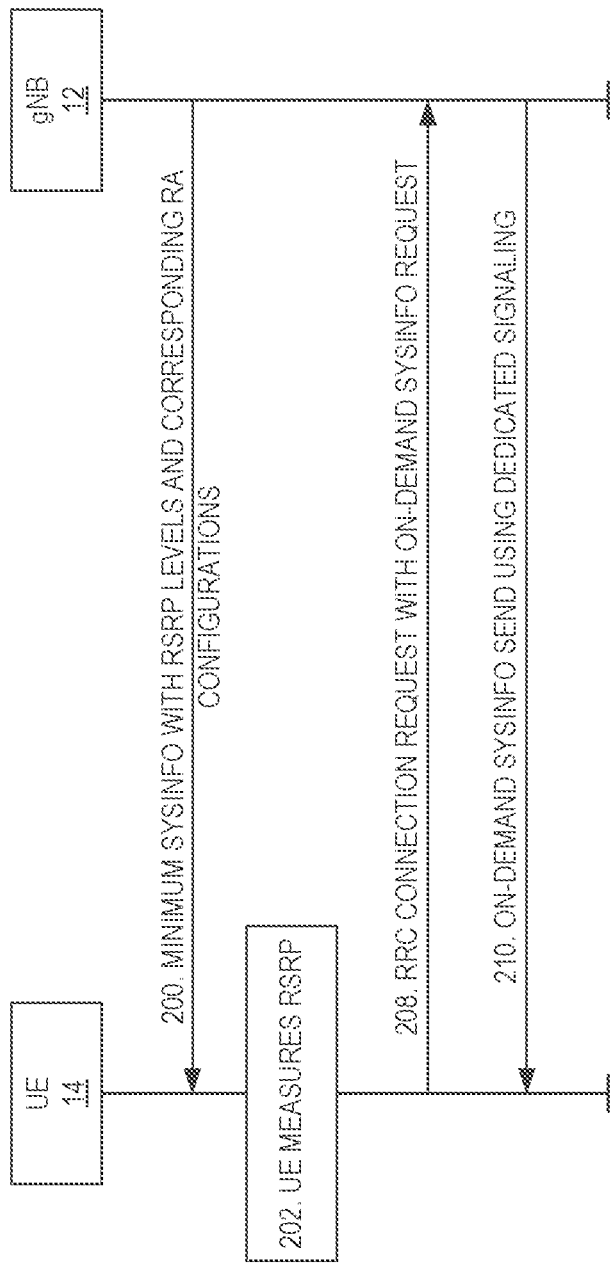
FIG. 5 illustrates the operation of a wireless device (e.g., a UE) and a radio access node (e.g., a gNB) according to some other embodiments of the present disclosure.

In another variation, the UE 14 may skip steps 106 and 108 of FIG. 3 or step 204 of FIG. 4 and may proceed directly to step 110 of FIG. 3 or step 208 of FIG. 4 where the UE 14 initiates an RRC connection request directly (e.g., using a special field to indicate that the UE 14 is requesting on-demand system information). One example of this variation is illustrated in FIG. 5. In one variation, the decision to send the RRC connection request is based on thresholds (e.g., based on RSRP) determining if the UE 14 is in good or bad coverage. If the UE 14 is in bad coverage, the UE 14 triggers RRC Connection Request to request dedicated signaling of on-demand system information. If the UE 14 is in good coverage, the UE 14 sends a preamble leading to broadcasted on-demand system information. In another variation, the decision to skip steps 106 and 108 of FIG. 3 or step 204 of FIG. 4 and send an RRC connection request based on one or some thresholds is based on information sent from the network, e.g. in the minimum system information.

In another variation, there are a limited number of preambles per coverage level to request system information. In this case, after receiving the RAR, the UE 14 initiates a second random access procedure from Msg1 to request resources to send an RRC connection request. In other words, rather than following the normal random access procedure with Msg1, followed by a RAR, followed by Msg3, the random access procedure is restarted with Msg1, where this re-start is referred to as the second random access procedure. This is needed to solve potential contention on the random access channel. In another variation, there are many preambles allocated per coverage level. The UE 14 selects the random preamble for Msg1, and the RAR includes the preamble sent in Msg1 as well as indication to the UE 14 that the UE 14 should make an RRC connection request for dedicated signaling as described above. The inclusion of the preamble sent in Msg1 into the RAR allows the network to resolve, at least partially, any potential contention. The UE 14 can directly proceed to sending Msg3 and the RRCConnectionRequest based on the grant received in the RAR.

In another variation, the RAR sent by the network, e.g., the gNB 12 may contain information that UEs with certain coverage level(s) shall initiate a second request procedure starting from, e.g., Msg1 or Msg3 to request transmission of on-demand system information using dedicated signaling. When several UEs, which may be in different coverage levels, are requesting on-demand system information, the network (e.g., the gNB 12) can then inform several UEs about whether they shall request transmission of on-demand system information using dedicated signaling or not, based on their coverage level (e.g., measured RSRP). The information in the RAR, indicating what UEs that shall request transmission of on-demand system information using dedicated signaling or not, may also be based on other criteria, such as, e.g., subscription level or type of UE.

In one embodiment, instead of sending RRC Connection Request, the UE 14 sends a specific system information request message which may be a new RRC message. The gNB 12 provides system information as a response to this message instead of setting up the connection.

In one variation, the UE 14 sends RRC connection request as in step 110 but instead of replying with RRC connection setup, the network, e.g., the gNB 12, replies with the RRC Connection Release which also includes requested parameters.

In all steps, the RRC connection request can be an RRC resume request if the UE 14 is in inactive state instead of IDLE state.

The network, e.g., the gNB 12, can utilize the preamble information to perform link adaptation for broadcasted or dedicated system information. In one embodiment, scheduling information for the SIBs needs to be re-read, e.g. from SIB1 after sending the preamble. In another embodiment, the network may apply beamforming on the transmission of the broadcasted system information as a response to a request preamble, to increase the coverage of the transmission. Beamforming parameters can be selected based on the reception of the preamble.

Figure 6:
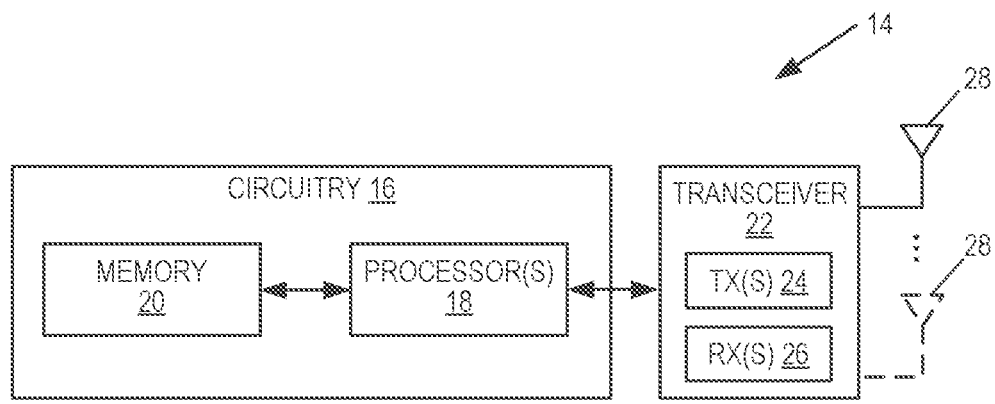
FIGS. 6 and 7 illustrate example embodiments of a wireless device.

FIG. 6 is a schematic block diagram of the wireless device 14 (e.g., UE 14) according to some embodiments of the present disclosure. As illustrated, the wireless device 14 includes circuitry 16 comprising one or more processors 18 (e.g., Central Processing Units (CPUs), Application Specific Integrated Circuits (ASICs), Field Programmable Gate Arrays (FPGAs), and/or the like) and memory 20. The wireless device 14 also includes one or more transceivers 22 each including one or more transmitters 24 and one or more receivers 26 coupled to one or more antennas 28. In some embodiments, the functionality of the wireless device 14 described above may be fully or partially implemented in software that is, e.g., stored in the memory 20 and executed by the processor(s) 18.

In some embodiments, a computer program including instructions which, when executed by the at least one processor 18, causes the at least one processor 18 to carry out the functionality of the wireless device 14 according to any of the embodiments described herein is provided. In some embodiments, a carrier containing the aforementioned computer program product is provided. The carrier is one of an electronic signal, an optical signal, a radio signal, or a computer readable storage medium, e.g., a non-transitory computer readable medium such as memory.

Figure 7:
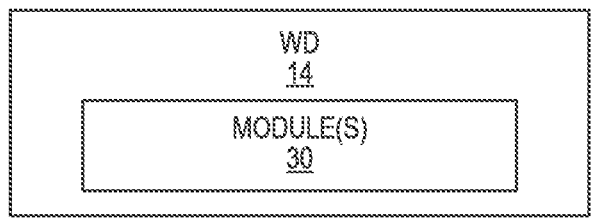

FIG. 7 is a schematic block diagram of the wireless device 14 (e.g., UE 14) according to another embodiment of the present disclosure. The wireless device 14 includes one or more modules 30, each of which is implemented in software. The module(s) 30 provide the functionality of the wireless device 14 described herein. The module(s) 30 may comprise, for example, a selecting module operable to perform step 104 of FIG. 3, an initiating module operable to perform step 106 of FIG. 3, a deciding module operable to perform step 108 of FIG. 3, a connection set-up initiating module operable to perform step 110 of FIG. 3, a receiving module operable to perform step 112 of FIG. 3, a deciding module operable to perform step 116 of FIG. 3, and a using module operable to perform step 118 of FIG. 3.

Figure 8:
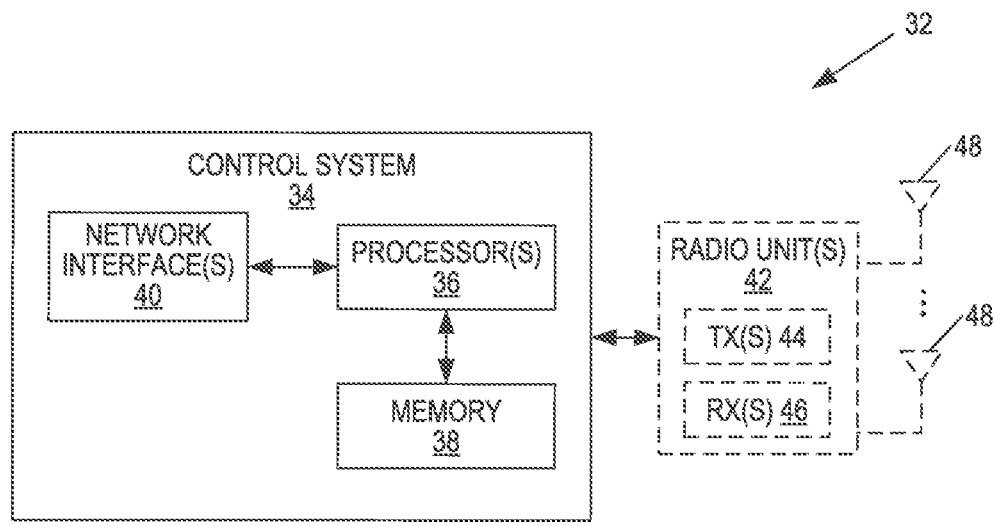
FIGS. 8 through 10 illustrate example embodiments of a network node.

FIG. 8 is a schematic block diagram of a network node 32 (e.g., a radio access node 12 such as, for example, the gNB 12) according to some embodiments of the present disclosure. As illustrated, the network node 32 includes a control system 34 that includes circuitry comprising one or more processors 36 (e.g., CPUs, ASICs, FPGAs, and/or the like)

and memory 38. The control system 34 also includes a network interface 40. In embodiments in which the network node 32 is a radio access node 12, the network node 32 also includes one or more radio units 42 that each include one or more transmitters 44 and one or more receivers 46 coupled to one or more antennas 48. In some embodiments, the functionality of the network node 32 (e.g., the functionality of the radio access node 12 or the gNB 12) described above may be fully or partially implemented in software that is, e.g., stored in the memory 38 and executed by the processor(s) 36.

Figure 9:
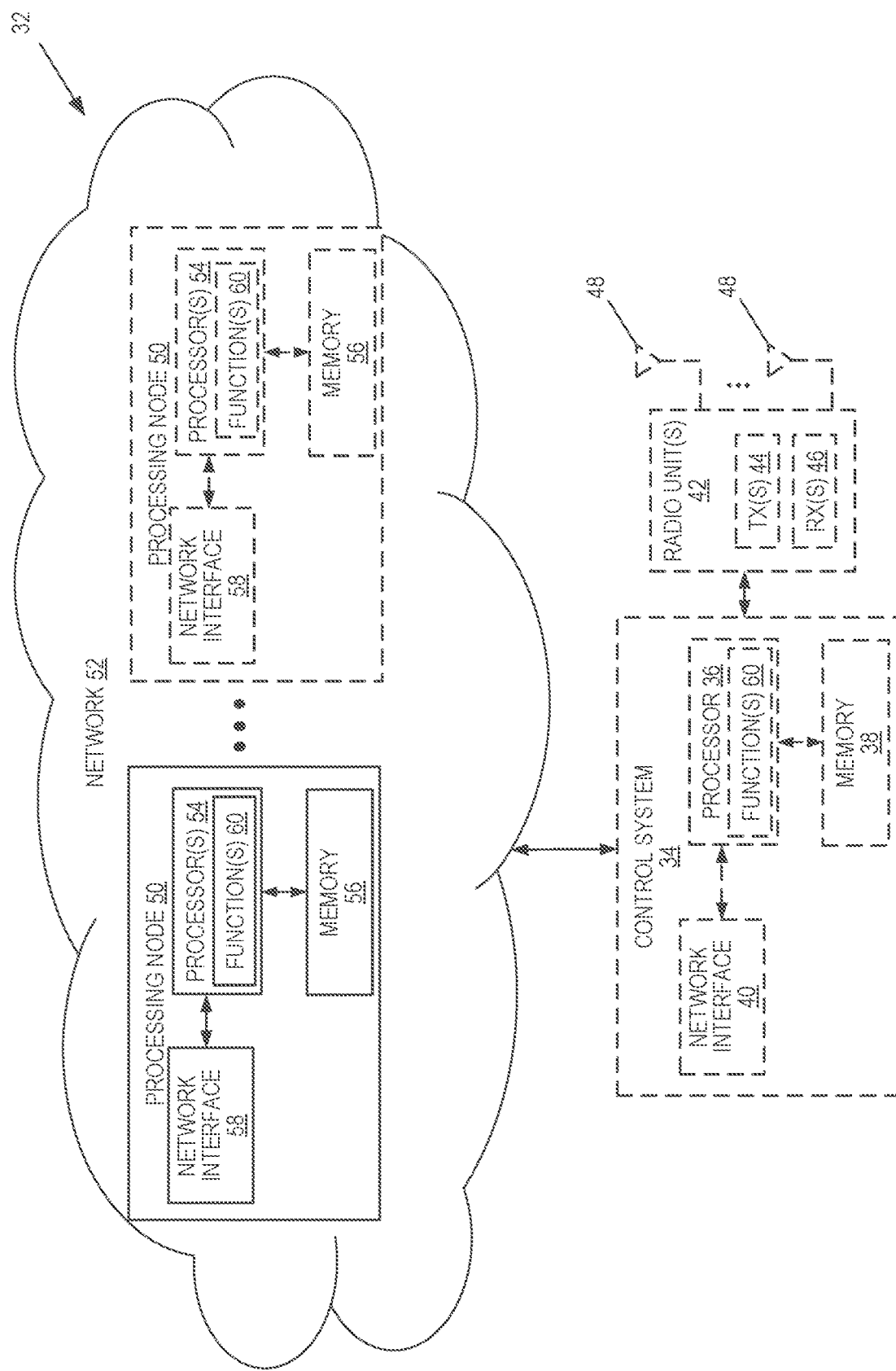

FIG. 9 is a schematic block diagram that illustrates a virtualized embodiment of the network node 32 (e.g., the radio access node 12 or the gNB 12) according to some embodiments of the present disclosure. As used herein, a "virtualized" network node 32 is a network node 32 in which at least a portion of the functionality of the network node 32 is implemented as a virtual component (e.g., via a virtual machine(s) executing on a physical processing node(s) in a network(s)). As illustrated, the network node 32 optionally includes the control system 34, as described with respect to FIG. 8. In addition, if the network node 32 is the radio access node 12, the network node 32 also includes the one or more radio units 42, as described with respect to FIG. 8. The control system 34 if present is connected to one or more processing nodes 50 coupled to or included as part of a network(s) 52 via the network interface 40. Alternatively, if the control system 34 is not present, the one or more radio units 42 (if present) are connected to the one or more processing nodes 50 via a network interface(s). Alternatively, all of the functionality of the network node 32 described herein may be implemented in the processing nodes 50 (i.e., the network node 32 does not include the control system 34 or the radio unit(s) 42). Each processing node 50 includes one or more processors 54 (e.g., CPUs, ASICs, FPGAs, and/or the like), memory 56, and a network interface 58.

In this example, functions 60 of the network node 32 described herein are implemented at the one or more processing nodes 50 or distributed across the control system 34 if present and the one or more processing nodes 50 in any desired manner. In some particular embodiments, some or all of the functions 60 of the network node 32 described herein are implemented as virtual components executed by one or more virtual machines implemented in a virtual environment(s) hosted by the processing node(s) 50. As will be appreciated by one of ordinary skill in the art, additional signaling or communication between the processing node(s) 50 and the control system 34 (if present) or alternatively the radio unit(s) 42 if present is used in order to carry out at least some of the desired functions. Notably, in some embodiments, the control system 34 may not be included, in which case the radio unit(s) 42 (if present) communicates directly with the processing node(s) 50 via an appropriate network interface(s).

In some particular embodiments, higher layer functionality (e.g., layer 3 and up and possibly some of layer 2 of the protocol stack) of the network node 32 may be implemented at the processing node(s) 50 as virtual components, i.e., implemented "in the cloud", whereas lower layer functionality (e.g., layer 1 and possibly some of layer 2 of the protocol stack may be implemented in the radio unit(s) 42 and possibly the control system 34.

In some embodiments, a computer program including instructions which, when executed by the at least one processor 36, 54, causes the at least one processor 36, 54 to carry out the functionality of the network node 32 or a processing node 50 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as the memory 56).

Figure 10:
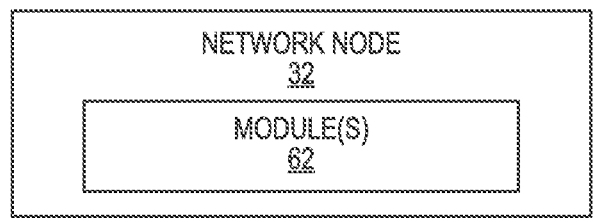

FIG. 10 is a schematic block diagram of the network node 32 (e.g., the radio access node 12) according to some other embodiments of the present disclosure. The network node 32 includes one or more modules 62, each of which is implemented in software. The module(s) 62 provide the functionality of the network node 32 described herein. The module(s) 62 may comprise a detecting module operable to perform step 206 of FIG. 4, a broadcasting module operable to perform step 206A of FIG. 4, a RAR transmitting module operable to perform step 206B of FIG. 4, a connection request receiving module operable to receive and process the RRC connection request of step 208 of FIG. 4, and a dedicated signaling module operable to provide on-demand system information to the UE 14 via dedicated signal in accordance with step 210 of FIG. 4.

Example Embodiments

While not being limited thereto, some example embodiments of the present disclosure are provided below.

Embodiment 1: A method for a wireless device (14) in a cellular network (10), comprising: performing (106, 204) a random access procedure in which a random access request is transmitted from the wireless device (14) to the cellular network (10) that indicates that the wireless device (14) is requesting on-demand system information; determining (108) whether the wireless device (14) receives a random access response as a response to the transmission of the random access request; if the wireless device (14) does not receive a random access response, attempting to receive (114, 206A) broadcast on-demand system information; and if the wireless device (14) receives a random access response, receiving (112, 210) on-demand system information from a radio access node (12) via dedicated signaling.

Embodiment 2: The method of embodiment 1 further comprising, prior to performing (106, 204) the random access procedure, selecting (104) one or more random access parameters to use for the random access procedure based on a measured quality level for a signal received, by the wireless device (14), from the cellular network (10); wherein performing (106, 204) the random access procedure comprises performing (106, 204) the random access procedure in accordance with the one or more random access parameters selected to use for the random access procedure.

Embodiment 3: The method of embodiment 1 further comprising upon attempting to receive (114, 206A) broadcast on-demand system information: determining (116) whether the wireless device (14) has received broadcast on-demand system information; and, upon determining (116, NO) that the wireless device (14) has not received broadcast on-demand system information, initiating (118, 106) a second random access procedure using updated random access parameters that correspond to a next worst coverage extension level.

Embodiment 4: The method of any one of embodiments 1 to 3 further comprising, if the wireless device (14) receives a random access response, initiating an RRC connection set-up with a request for on-demand system information.

Embodiment 5: The method of embodiment 4 wherein: initiating an RRC connection set-up comprises transmitting (208) an RRC connection request to the radio access node (12), the RRC connection request comprising a request for on-demand system information; and receiving (112, 210) the on-demand system information from the radio access node (12) via dedicated signaling comprises receiving (210) the on-demand system information from the radio access node (12) via dedicated signaling in response to sending the RRC connection request.

Embodiment 6: The method of embodiment 5 wherein receiving (210) the on-demand system information from the radio access node (12) via dedicated signaling in response to sending the RRC connection request comprises receiving (210) the on-demand system information from the radio access node (12) in an RRC Connection Setup message or an RRC Connection Reconfiguration message.

Embodiment 7: The method of embodiment 5 or 6 wherein the RRC connection request comprises a field that indicates that the wireless device (14) is requesting on-demand system information.

Embodiment 8: The method of any one of embodiments 1 to 3 further comprising: if the wireless device (14) receives a random access response, sending a system information request to the radio access node (12); wherein receiving (112, 210) the on-demand system information from the radio access node (12) via dedicated signaling comprises receiving (210) the on-demand system information from the radio access node (12) via dedicated signaling in response to sending the system information request.

Embodiment 9: The method of embodiment 8 wherein the system information request is an RRC message.

Embodiment 10: A wireless device (14) for a cellular network (10), the wireless device (14) adapted to operate according to the method of any one of embodiments 1 to 9.

Embodiment 11: A wireless device (14) for a cellular network (10) comprising: at least one transceiver (22); at least one processor (18); and memory (20) comprising instructions executable by the at least one processor (18) whereby the wireless device (14) is operable to perform the method of any one of embodiments 1 to 6.

Embodiment 12: A wireless device (14) for a cellular network (10) comprising: a random access performing module (30) operable to perform a random access procedure in which a random access request is transmitted from the wireless device (14) to the cellular network (10) that indicates that the wireless device (14) is requesting on-demand system information; a determining module (30) operable to determine whether the wireless device (14) receives a random access response as a response to the transmission of the random access request; a first receiving module (30) operable to, if the wireless device (14) does not receive a random access response, attempt to receive broadcast on-demand system information; and a second receiving module (30) operable to, if the wireless device (14) receives a random access response, receive on-demand system information from the radio access node (12) via dedicated signaling.

Embodiment 13: A method of operation of a network node (12, 32) in a cellular network, comprising: detecting (206) a random access request from a wireless device (14), the random access request indicating that the wireless device (14) is requesting on-demand system information; deciding (206) whether to deliver on-demand system information to the wireless device (14) via a broadcast or dedicated signaling; upon deciding to deliver on-demand system information to the wireless device (14) via a broadcast, broadcasting (206A) on-demand system information; and upon deciding to deliver on-demand system information to the wireless device (14) via dedicated signaling, delivering (206B, 210) on-demand system information to the wireless device (14) via dedicated signaling.

Embodiment 14: The method of embodiment 13 wherein deciding (206) whether to deliver on-demand system information to the wireless device (14) via a broadcast or dedicated signaling comprises deciding (206) whether to deliver on-demand system information to the wireless device (14) via a broadcast or dedicated signaling based on amount of coverage extension needed and/or current system load.

Embodiment 15: The method of embodiment 13 or 14 wherein delivering (206B, 210) on-demand system information to the wireless device (14) via dedicated signaling comprises: sending (206B) a random access response to the wireless device (14); receiving (208), from the wireless device (14), a connection request within an on-demand system information request; and upon receiving (208) the connection request with the on-demand system information request, sending (210) on-demand system information to the wireless device (14) via dedicated signaling.

Embodiment 16: The method of embodiment 15 wherein sending (210) on-demand system information to the wireless device (14) via dedicated signaling comprises sending on-demand system information to the wireless device (14) in an RRC Connection Setup message or an RRC Connection Reconfiguration message.

Embodiment 17: A network node (12, 32) for a cellular network (10), the network node (12, 32) adapted to operate according to the method of any one of embodiments 13 to 16.

Embodiment 18: A network node (12, 32) for a cellular network (10), comprising: at least one processor (36, 54); and memory (38, 56) comprising instructions executable by the at least one processor (36, 54) whereby the network node (12, 32) is operable to perform the method of any one of embodiments 13 to 26.

Embodiment 19: A network node (12, 32) for a cellular network (10), comprising: a detecting module (62) operable to detect a random access request from a wireless device (14), the random access request indicating that the wireless device (14) is requesting on-demand system information; a deciding module (62) operable to decide whether to deliver on-demand system information to the wireless device (14) via a broadcast or dedicated signaling; a broadcasting module (62) operable to, upon the deciding module (62) deciding to deliver on-demand system information to the wireless device (14) via a broadcast, broadcast on-demand system information; and a dedicated signaling module (62) operable to, upon the deciding module (62) deciding to deliver on-demand system information to the wireless device (14) via dedicated signaling, deliver on-demand system information to the wireless device (14) via dedicated signaling.

The following acronyms are used throughout this disclosure.

3GPP Third Generation Partnership Project
5G Fifth Generation
ASIC Application Specific Integrated Circuit
CPU Central Processing Unit
eMTC Enhanced Machine Type Communication
eNB Enhanced or Evolved Node B
FPGA Field Programmable Gate Array
gNB New Radio Base Station
HARQ Hybrid Automatic Repeat Request
LTE Long Term Evolution
MIB Master Information Block
MME Mobility Management Entity
mMTC Massive Machine Type Communication MTC Machine Type Communication
NB-IoT Narrowband Internet of Things
NR New Radio
PDN Packet Data Network
P-GW Packet Data Network Gateway
PRACH Physical Random Access Channel
RA Random Access
RAN Radio Access Network
RAR Random Access Response
RRC Radio Resource Control
RSRP Reference Signal Received Power
RSRQ Reference Signal Received Quality
SCEF Service Capability Exposure Function
SIB System Information Block
TR Technical Report
UE User Equipment Those skilled in the art will recognize improvements and modifications to the embodiments of the present disclosure. All such improvements and modifications are considered within the scope of the concepts disclosed herein.

What is claimed is:

1. A method of operation of a network node in a cellular communications network, comprising:
    transmitting, to a User Equipment (UE), minimum system information including a set of signal quality indication levels and respective corresponding random access preambles, wherein the respective signal quality indication levels are associated with respective signal quality levels measured at the UE and are independent of a number of repetitions of the respective corresponding random access preambles;
    detecting a particular random access preamble, from the UE, that corresponds to a particular signal quality indication level that is associated with a signal quality level measured at the UE;
    deciding whether to deliver on-demand system information to the UE via a broadcast or dedicated signaling based on the signal quality level measured at the UE, as indicated by the detected random access preamble;
    upon deciding to deliver on-demand system information to the UE via a broadcast, broadcasting on-demand system information; and
    upon deciding to deliver on-demand system information to the UE via dedicated signaling, delivering on-demand system information to the UE via dedicated signaling.

2. The method of claim 1 wherein the signal quality indication level is Reference Signal Received Power (RSRP) or Reference Signal Received Quality (RSRQ).

3. The method of claim 1 wherein delivering on-demand system information to the UE via dedicated signaling comprises:
    sending a random access response to the UE;
    receiving, from the UE, a connection request within an on-demand system information request; and
    upon receiving the connection request with the on-demand system information request, sending on-demand system information to the UE via dedicated signaling.

4. The method of claim 3 wherein sending on-demand system information to the UE via dedicated signaling comprises sending on-demand system information to the UE in a Radio Resource Control (RRC) Connection Setup message or an RRC Connection Reconfiguration message.

5. The method of claim 3 wherein sending on-demand system information to the UE via dedicated signaling comprises sending on-demand system information to the UE in a Radio Resource Control (RRC) Connection Release message.

6. The method of claim 3 wherein the connection request is an RRC connection request.

7. The method of claim 1 wherein delivering on-demand system information to the UE via dedicated signaling comprises:
    sending a random access response to the UE;
    receiving, from the UE, a Radio Resource Control (RRC) message within an on-demand system information request; and
    upon receiving the RRC message with the on-demand system information request, sending on-demand system information to the UE via dedicated signaling.

8. The method of claim 1 wherein delivering on-demand system information to the UE via dedicated signaling comprises:
    sending a random access response to the UE;
    receiving, from the UE, a Radio Resource Control (RRC) resume request within an on-demand system information request; and
    upon receiving the RRC resume request with the on-demand system information request, sending on-demand system information to the UE via dedicated signaling.

9. A network node configurable to operate in a cellular communications network, comprising:
    at least one processor; and
    at least one memory comprising computer-executable instructions that, when executed by the at least one processor, configure the network node to:
        transmit, to a User Equipment (UE), minimum system information including a set of signal quality indication levels and respective corresponding random access preambles, wherein the respective signal quality indication levels are associated with respective signal quality levels measured at the UE and are independent of a number of repetitions of the respective corresponding random access preambles;
        detect a particular random access preamble, from the UE, that corresponds to a particular signal quality indication level that is associated with a signal quality level measured at the UE;
        decide whether to deliver on-demand system information to the UE via a broadcast or dedicated signaling based on the signal quality level measured at the UE, as indicated by the detected random access preamble;
        upon deciding to deliver on-demand system information to the UE via a broadcast, broadcast on-demand system information; and
        upon deciding to deliver on-demand system information to the UE via dedicated signaling, deliver on-demand system information to the UE via dedicated signaling.

10. A method for a User Equipment (UE) configurable to operate in a cellular communications network, the method comprising:
    receiving, from the cellular communications network, minimum system information including a set of signal quality indication levels and respective corresponding random access preambles, wherein the respective signal quality indication levels are associated with respective signal quality levels measured at the UE and are independent of a number of repetitions of the respective corresponding random access preambles;

measuring a signal quality level at the UE;

transmitting a particular random access preamble that corresponds to a particular signal quality indication level that is associated with the measured signal quality level; and receiving, from the cellular communications network, on-demand system information via broadcast or dedicated signaling depending on the measured signal quality level as indicated by the particular random access preamble.

11. The method of claim 10 wherein the signal quality indication level is Reference Signal Received Power (RSRP) or Reference Signal Received Quality (RSRQ).

12. The method of claim 10 wherein receiving on-demand system information via broadcast or dedicated signaling comprises:

receiving, from the cellular communications network, a random access response comprising an indication to establish a connection for on-demand system information;

sending a connection request to the cellular communications network, the connection request comprising a request for on-demand system information; and receiving, from the cellular communications network, the on-demand system information using dedicated signaling.

13. The method of claim 12 wherein receiving the on-demand system information via dedicated signaling comprises receiving the on-demand system information in a Radio Resource Control (RRC) Connection Setup message or an RRC Connection Reconfiguration message.

14. The method of claim 12 wherein receiving the on-demand system information via dedicated signaling comprises receiving the on-demand system information in a Radio Resource Control (RRC) Connection Release message.

15. The method of claim 12 wherein the connection request is an RRC connection request.

16. The method of claim 10 wherein receiving on-demand system information via broadcast or dedicated signaling comprises:

receiving, from the cellular communications network, a random access response comprising an indication to establish a connection for on-demand system information;

sending a Radio Resource Control (RRC) message to the cellular communications network, the RRC message comprising a request for on-demand system information; and receiving, from the cellular communications network, the on-demand system information using dedicated signaling.

17. The method of claim 10 wherein receiving on-demand system information via broadcast or dedicated signaling comprises:

receiving, from the cellular communications network, a random access response comprising an indication to establish a connection for on-demand system information;

sending a Radio Resource Control (RRC) resume request to the cellular communications network, the RRC resume request comprising a request for on-demand system information; and receiving, from the cellular communications network, the on-demand system information via dedicated signaling.

18. A User Equipment (UE) configurable for operation in a cellular communications network, the UE comprising:

at least one transceiver;

at least one processor; and at least one memory storing computer-executable instructions that, when executed by the at least one processor, configure the UE to:

receive, from the cellular communications network via the at least one transceiver, minimum system information including a set of signal quality indication levels and respective corresponding random access preambles, wherein the respective signal quality indication levels are associated with respective signal quality levels measured at the UE and are independent of a number of repetitions of the respective corresponding random access preambles;

measure a signal quality level at the UE;

transmit, via the at least one transceiver, a particular random access preamble that corresponds to a particular signal quality indication level that is associated with the measured signal quality level; and receive, from the cellular communications network via the at least one transceiver, on-demand system information via broadcast or dedicated signaling depending on the measured signal quality level as indicated by the particular random access preamble.

19. A method for a User Equipment (UE) in a cellular communications network, comprising:

measuring a signal quality level at the UE to obtain a signal quality level measurement;

upon determining that the signal quality level measurement is less than a threshold that is indicative of the UE being in a bad coverage scenario:

sending, to the cellular communications network, a radio resource control (RRC) message comprising a request for on-demand system information to be provided via dedicated signaling; and receiving on-demand system information from the cellular communications network via dedicated signaling in response to the RRC message; and upon determining that the signal quality level measurement is greater than a threshold that is indicative of the UE being in a good coverage scenario:

sending, to the cellular communications network, a random access preamble corresponding to a request for broadcast of the on-demand system information, wherein the request for broadcast is independent of a number of repetitions of the random access preambles; and receiving a broadcast of the on-demand system information from the cellular communications network in response to the random access preamble.

20. The method of claim 19 wherein the dedicated signaling comprises an RRC Connection Setup message or an RRC Connection Reconfiguration message.

21. The method of claim 19 wherein the dedicated signaling comprises an RRC Connection Release message.

22. The method of claim 19 wherein the RRC message is an RRC connection request.

23. A User Equipment (UE) configurable for operation in a cellular communications network, the UE comprising:

at least one transceiver;

at least one processor; and at least one memory storing computer-executable instructions that, when executed by the at least one processor, configure the UE to:

measure a signal quality level at the UE to obtain a signal quality level measurement;

upon determining that the signal quality level measurement is less than a threshold that is indicative of the UE being in a bad coverage scenario:
  send, to the cellular communications network, a radio resource control (RRC) message comprising a request for on-demand system information to be provided via dedicated signaling; and
  receive on-demand system information from the cellular communications network via dedicated signaling in response to the RRC message; and
upon determining that the signal quality level measurement is greater than a threshold that is indicative of the UE being in a good coverage scenario:
  send, to the cellular communications network, a random access preamble corresponding to a request for broadcast of the on-demand system information, wherein the request for broadcast is independent of a number of repetitions of the random access preambles; and
  receive a broadcast of the on-demand system information from the cellular communications network in response to the random access preamble.

* * * * *